United States Patent
Kieselbach

(10) Patent No.: US 6,481,272 B1
(45) Date of Patent: Nov. 19, 2002

(54) DEVICE FOR MEASURING ANGULAR ROTATION BY PRODUCING A PIVOTAL MOVEMENT OF A SENSOR UNIT

(75) Inventor: Jürgen Kieselbach, Emsetal (DE)

(73) Assignee: PWB-Ruhlatec Industrieprodukte GmbH, Seebach (DE)

( * ) Notice: Subject to any disclaimer, the term of this patent is extended or adjusted under 35 U.S.C. 154(b) by 36 days.

(21) Appl. No.: 09/671,885

(22) Filed: Sep. 5, 2000

(30) Foreign Application Priority Data

Sep. 6, 1999 (DE) .......................................... 199 42 322

(51) Int. Cl.⁷ ............................................. G01M 19/00
(52) U.S. Cl. ........................ 73/118.1; 73/1.75; 33/1 N; 33/1 PT; 116/31
(58) Field of Search ............................. 33/1 N, 1 PT; 116/31; 73/1.75, 1.79, 118.1

(56) References Cited

U.S. PATENT DOCUMENTS

| | | | |
|---|---|---|---|
| 3,675,510 A | | 7/1972 | Duggar, Jr. .................. 74/801 |
| 4,682,104 A | * | 7/1987 | Lombard et al. ....... 324/207.17 |
| 4,864,893 A | | 9/1989 | Hori ........................... 74/788 |
| 4,966,041 A | * | 10/1990 | Miyazaki ................. 324/207.2 |
| 5,010,784 A | * | 4/1991 | Nakazato et al. ............. 116/31 |
| 5,218,769 A | * | 6/1993 | Tranchon ..................... 33/1 N |
| 5,309,758 A | * | 5/1994 | Kubota et al. ................ 29/592 |
| 5,567,874 A | * | 10/1996 | Suzuki et al. .............. 73/118.2 |
| 5,816,594 A | * | 10/1998 | Howard ................... 280/89.13 |
| 6,155,106 A | * | 12/2000 | Sano ............................ 33/1 N |

FOREIGN PATENT DOCUMENTS

| | | |
|---|---|---|
| EP | 0 274 089 A1 | 7/1988 |
| EP | 0 477 653 A2 | 9/1991 |
| EP | 0 559 626 A1 | 9/1993 |
| EP | 1 022 545 A1 | 1/2000 |
| JP | 7-133846 | 5/1995 |
| WO | WO 93/03329 | 7/1992 |

\* cited by examiner

*Primary Examiner*—Eric S. McCall
(74) *Attorney, Agent, or Firm*—Darby & Darby

(57) ABSTRACT

A device responsive to angular rotation of an object, such as provided by a driving unit, to produce a geared-down pivotal measuring movement by including a reduction gear formed by a differential planetary gear mounted on a frame plate jointly with a rotatably supported angle diaphragm which enables the rotational angle and/or the number of rotations of the object to be measured to be indicated opto-electronically. The differential planetary gear has an input gear in the form of a change gear which engages the shaft rotation to be measured. Next to the input gear, an internally toothed, annular reference gear is fixedly attached to the frame, and between a pinion positioned on the hub of the input gear and the internal toothing of the reference gear, there is a planetary gear which engages both the internal toothing of the reference gear and of an output gear whose number of teeth is different from that of the reference gear, with the output gear operating a pivot lever, engaging a claw of the angle diaphragm. In a preferred embodiment, the input gear, the reference gear, the output gear and the pinion are arranged concentrically relative to a common rotational axis.

7 Claims, 2 Drawing Sheets

DEVICE FOR MEASURING ANGULAR ROTATION BY PRODUCING A PIVOTAL MOVEMENT OF A SENSOR UNIT

FIELD OF THE INVENTION

The invention relates to a reduction gear for rotational and pivotal movements, especially for measuring and driving units, which reduction gear can be coupled to the unit to be measured or to the drive and which generates a geared-down measuring movement extending the measuring range or a greatly geared-down driving movement.

BACKGROUND OF THE INVENTION

Reduction gears for rotational and pivotal movements are known in driving simulators, for example, wherein, usually, the rotational angle of a steering wheel is electronically evaluated in the form of a 3D-simulation on a screen for representing a driving condition.

Recently, devices for measuring rotational angles and for counting rounds (rotations) have also been required for steering angle sensors in motor vehicles. However, in this case, there exist special requirements regarding the installation dimensions, functional safety and accuracy of the measuring device.

From U.S. Pat. No. 4,952,874, there is known a position detecting system with switchable reading units. This system is used for machine tools comprising a tool holder which is rotatable by 360°.

U.S. Pat. No. 4,145,608 proposes a device for detecting reference positions in rotating machine parts. This device is used, for example, for setting the ignition of internal combustion engines.

U.S. Pat. No. 5,567,874 shows a device for detecting rotational angles, for instance in throttle valves. This device can be used for converting rotational angles into corresponding resistance values.

To the extent that the prior art components are used to produce a steering angle sensor of the aforementioned type, the sensor consists of a first sensor unit whose rotor is coupled to the rotational movement of the steering wheel and a second sensor unit which has a rotation (rounds) counting function. The rotor of the second sensor unit is coupled to the rotor of the first sensor unit at a gear reduction ratio of 4:1 by a planetary gear. The rotational axes of the two rotors are arranged concentrically relative to one another. The inner rotor is connected to the steering spindle in a rotational way and, when the steering wheel rotates, the inner rotor drives the outer rotor of the second sensor unit, which outer rotor is driven via the planetary gear.

The concentric arrangement between the steering spindle, the rotor of the first sensor unit and the rotor of the second sensor unit means that the prior art steering angle sensor, in the radial direction relative to the longitudinal axis, requires a relatively large installation space. Furthermore, the sensor unit codings of prior art steering angle sensors are provided in the form of magnetic markings of the Gray Codes type, and the detection devices are so-called Hall sensors which, for the purpose of scanning the magnetic coding, are arranged at the circumference of the code disc. As a result, there are required relatively expensive hardware components which take up a great deal of space.

OBJECT OF THE INVENTION

It is therefore an object of the present invention to develop a drive for measuring rotational angles and counting rounds of shaft axes and wheel positions, which drive comprises a measuring accuracy of $\leq 0.5$ arc degrees within a temperature range of 40 to +80° and whose maximum diameter is <2 times the steering tube diameter with a maximum housing depth of one half ½ the diameter of a steering tube.

BRIEF DESCRIPTION OF THE INVENTION

The present invention relates to an inventive reduction gear for rotational and pivotable movements, especially for measuring and driving units, which reduction gear can be coupled to the unit to be measured or to a driveshaft and which generates a geared-down measuring movement extending the measuring range or a greatly geared-down driving movement is mounted in the form of a differential planetary gear on a frame plate jointly with a rotatably supported angle diaphragm which enables the rotational angle and/or the number of rounds (rotations) of the object to be measured to be optically indicated. The differential planetary gear includes an input gear which is provided in the form of a change gear and which engages the driving ring gear of the unit to be measured. Next to the input gear, an internally toothed, annular reference gear is fixedly attached to the frame and wherein, between a pinion positioned on the hub of the input gear and the internal toothing of the reference gear, there is arranged a planetary gear which engages both the internal toothing and an output gear whose number of teeth differs from that of the reference gear. The output gear drives a pivot lever which engages a claw of the angle diaphragm. In a preferred embodiment, the input gear, the reference gear, the output gear and the pinion are arranged concentrically relative to a common axis.

It is advantageous for the angle diaphragm to be held under spring-pretension and for a cover plate to be arranged parallel to the frame plate, in which cover plate there are supported the axis and the angle diaphragm. The input gear is preferably provided in the form of a coupling for a driving unit and the output gear comprises a central shaft output end designed as an output unit. The input and output units are preferably supported in the frame plate and cover plate, with the reduction gear being flanged to the drive, thus forming one unit therewith.

The inventive reduction gear for measuring and driving purposes can be integrated into a steering angle sensor for example for determining the absolute angular position of the steering wheel of a motor vehicle. For this purpose, a first sensor unit is coupled to a second sensor unit. The first sensor unit includes a first rotor carrying a first coding and coupled to the rotational movement of the steering wheel and a detection device, for instance a sensor, arranged at the stator end and provided for scanning the coding of the rotor within one angle segment of the entire range of rotation of the steering wheel. The second sensor unit includes a rotor coupled via a gear to the rotor of the first sensor unit, of a coding movable by the rotor and of a detection device arranged at the stator end and provided for scanning the coding within the entire range of rotation of the steering wheel.

By use of one or more adjoining converter elements, the detection device of the first sensor unit can be converted into a sensor array, with the sensor array being suitable for scanning the coding of the rotor of the first sensor unit and for scanning the coding of the second sensor unit. The rotor 30 of the first sensor unit preferably is provided in the form of a code disc and the sensor array 20 extending radially relative to the rotational axis of the code disc and including the converter elements is arranged towards the flat side of the code disc carrying the coding.

In a preferred embodiment the gear coupling the rotor of the second sensor unit to the rotor of the first sensor unit is a differential planetary gear which comprises an input gear provided in the form of a change gear and engaging the driving ring gear of the first sensor unit, and, next to the input gear, an internally toothed, annular reference gear fixedly arranged at the frame. Between a pinion positioned on the hub of the input gear and the inner toothing of the reference gear there is arranged a planetary gear which engages both the inner toothing and the rotor of the second sensor unit, designed as an output gear, has a number of teeth which has been changed as compared to that of the reference gear. The rotor, through a pivot lever, engages a claw of an arm which carries the coding of the second sensor unit and is pivotably supported between the rotor and the sensor array.

BRIEF DESCRIPTION OF THE DRAWINGS

Below, the invention is explained in greater detail with reference to an embodiment in which.

DETAILED DESCRIPTION OF THE INVENTION

Figure 1:
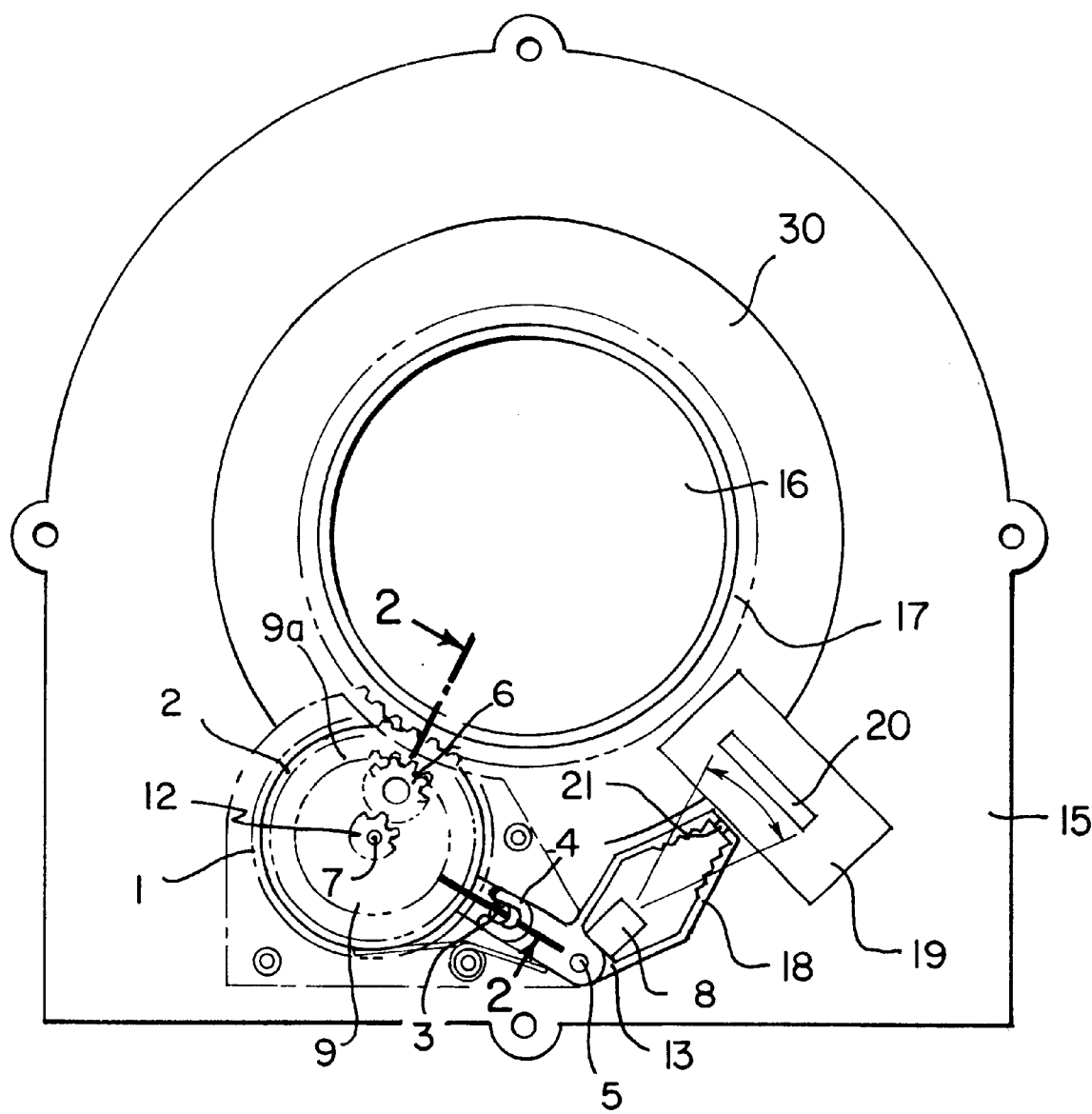
FIG. 1 is an overall view of a steering gear with steering angle sensors.
Figure 2:
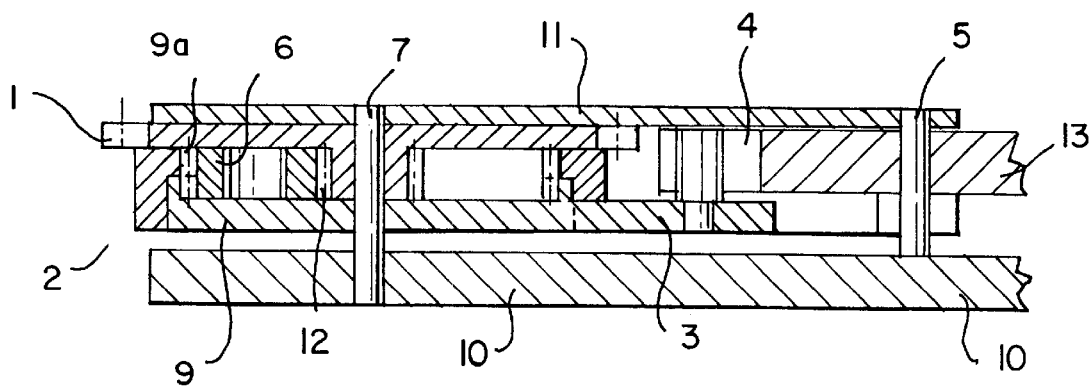
FIG. 2 shows a cross-section along line AB of the gear of FIG. 1.

Referring to FIGS. 1 and 2 the opto-electrically operating steering angle sensor is described with reference to a steering unit although it can be used in other devices. The sensor comprises two sensor units, with the first sensor unit including a conventional line sensor 20 with a plurality of opto-electronic converter elements. The line sensor is aligned radially relative to the rotational axis of the steering column 16. The length of the line sensor and the distance covered by the converter elements extend over the range to be measured, which is occupied by the code track in the radial direction for example.

The second sensor unit comprises a light source 8 arranged in a diaphragm 18. At its front end, the diaphragm 18 comprises a diaphragm aperture 21 which permits a ray of light to emerge from the diaphragm. The second sensor unit with diaphragm 18 is pivotable around an axis 5, as indicated by the double arrow, so that the ray of light emerging from the diaphragm aperture 21, as a function of the angular position of the diaphragm 18, can shine on different converter elements of the line sensor 20. For deflecting the rays of light leaving the diaphragm opening 21 into the plane from where they can shine on to the line sensor 20, an optical member (not illustrated) is arranged above the line sensor.

The sensor units serve to detect the angular position of the steering wheel and of the steering column 16 within one segment of 360° of an assumed total range four steering wheel rotations (1440°). For detecting the position of the steering column 16 within the total range of steering wheel rotations of 1440°, the movement of the diaphragm 18 is calculated in such a way that when passing through the range of 1440°, the ray of light emerging from the diaphragm aperture 21 moves across the entire photo-sensitive surface of the line sensor 20. The movement of the second sensor unit including diaphragm 18 is coupled to the rotational movement of the steering column 16 by a gear and a pivot lever in accordance with the invention.

The gear used is a different planetary gear whose components are arranged on a frame plate. The planetary gear consists of an input gear engaging a axis 17 connected in a rotationally fast way to the steering column 16. On the axis 7 of the gear 1 there is supported a reference gear 2 forming the rotor of the second sensor unit and provided in the form of a hollow gear and having an inner toothing 12a. Between the inner toothing 12a and a opinion 12, also supported on the axis 7 between the input gear and the output gear, there is arranged the planetary gear 6. Furthermore, the planetary gear 6 is associated with an internally toothed, annular reference gear 2 which is positioned next to the input gear and which is arranged so as to be fixed to the frame. The planetary gear 6 engages both the internal toothing of the reference gear 2 and the internal toothing 9a of the output gear 9, but the number of teeth of the reference gear 2 has been changed relative to the number of teeth of the output gear 9.

When the input gear 1 rotates, the rotational movement is transmitted via the pinion 12 and the planetary gear 6 to the output gear 9 whose outer circumference is provided with the pivot lever 3. Because the output gear 9 and the reference gear 2 have different numbers of teeth, the simultaneous rolling contact movement of the planetary gear 6 in the inner toothing of the reference gear 2 causes the output gear 9 to pivot, which pivot movement, in turn, results in a pivot movement of the pivot lever 3. By means of its free end, the pivot lever 3 has been inserted into a claw 4 which forms part of a two-arm lever 13 whose lever axis constitutes the pivot axis 5, with the diaphragm 18 constituting the further arm of the lever 13. A rotational movement of the output gear 9 serving as the rotor of the second sensor unit 8 then causes the above-described pivot movement of the diaphragm 18.

To accommodate for any play between the gears, the pivot lever 3 can be designed so as to operate against a spring element 26, as shown in FIG. 1.

As an example of the inventive reduction gear, FIG. 2 shows a device for measuring rotational angles and for counting rounds. The steering gear 15, the steering column 16 and the driving ring gear 17 (not shown) engage the input gear 1. At the output end, the lever 3, the angle diaphragm 18 which covers an angular region 19 of the sensor 20 are not shown.

For reasons of space, it is preferred that the input and output gears 1 and 9 are inserted into one another, with the internally toothed reference gear 2 being arranged concentrically to and within the input gear 1 and being fixed in position. The internal toothing of the reference gear 2 engages output gear 9 which is also internally toothed and whose number of teeth is different from the number of teeth of the reference gear 2.

The pinion of the input gear 1 drives planetary gear 6, so that the planetary gear moves with rolling contact in the reference gear 2 and simultaneously in the output gear 9. Because of the different numbers of teeth in the reference gear 2 and output gear 9 and as a result of the simultaneous rolling contact movement of the planetary gear 6 in the reference gear 2 and output gear 9, there is achieved a pivot movement of the output gear, achieving pivot angles of approximately 180°, in the example approximately 30°.

The input gear 1, the reference gear 2 and the output gear 9 can form a cylindrical unit whose planar faces consist of a side face each of the input gear and the output gear and whose cylindrical outer face is formed by the annular face of the reference gear. In this way, the inventive reduction gear is put into effect in the form of a compact unit which can be integrated into different measuring and driving units.

The embodiment shown in FIGS. 1 and 2 can be varied in that the input gear is designed as a coupling, with the output gear comprising a central shaft output end which permits the output to be transmitted to other shafts, gears or rotating parts. Depending on the switching condition, the input gear is capable of being coupled to provide the connection with a driving unit.

Figure 3:
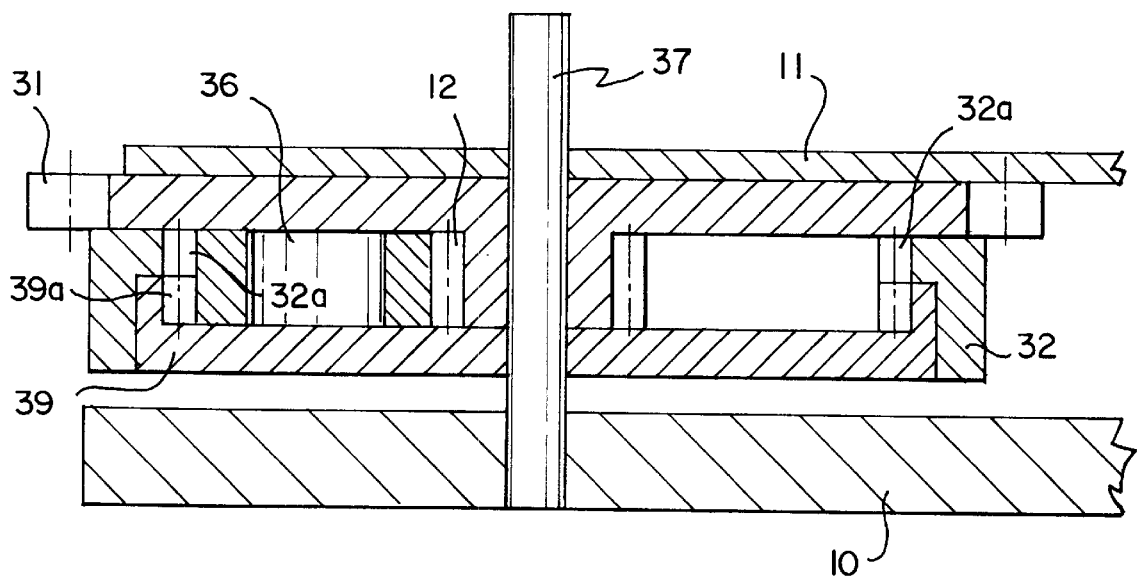
FIG. 3 is a cross-section through a further variant of the gear in accordance with the invention.

According to FIG. 3, the input gear 31 is arranged on a shaft 37 which is supported in the frame plate 10 and the cover plate 11. An output gear 39 provided in the form of a hollow gear and comprising inner toothing 39a is also supported on the shaft 37. Between the inner toothing 39a and the pinion 12 of the input gear 31, there is arranged a planetary gear 36. When the input gear 31 rotates, the rotational movement of the input gear 31 is transmitted via the planetary gear 36 to the output gear 39. As soon as the input gear 31 is moved by the object to be measured, the pinion designed as the hub of the input gear also rotates. The planetary gear 36 is made to move together with the pinion 12 and carries out a rolling contact movement on the internal toothing 39a of the output gear 39.

Because of the different numbers of teeth of the internal toothing 39a of the output gear 39 and the internal toothing 32a of the reference gear 32, the output gear 39 and thus the shaft 37 fixedly connected thereto are rotated at the differential speed during the rotation of the planetary gear 36. It is possible to achieve reduction ratios of up to 1:300.

In a further alternative of the reduction gear in accordance with the invention, the frame plate and the cover plate of the input and output are designed in such a way that they can be connected directly to an input or output to form one unit. This is preferably effected by using suitably designed flanges which are releasably connected to one another by bolts or clamping locks.

The unit can also be formed of a linearly movable slide, for example for machining equipment or textile machinery, in which case the linear movement is converted by a suitable movement converter into a rotational input movement of the reduction gear. Analogously to the initially described application in the form of a "steering angle sensor", incremental distance measurements of the machine can be effected by suitable detection devices such as a clock disc, with the signals being converted by the inventive reduction gear into a limit switch function for the linear movement.

The foregoing embodiments demonstrate methods and devices implemented and contemplated by the inventors in making and carrying out the invention. While the invention has been particularly shown and described with reference to the preferred embodiments thereof, the embodiments are not intended to be exhaustive or to limit the invention to the precise forms disclosed herein. It will be understood by those skilled in the art that various changes in form and detail may be made therein without departing from the spirit and scope of the invention. Numerous equivalent methods, devices, and techniques may be employed to achieve the same result. Similarly, any process steps described may be interchangeable with other steps in order to achieve the same result. It is intended that the scope of the invention is defined by the following claims and their equivalents.

I claim:

1. A device responsive to angular rotation of a driving unit to produce a geared-down pivotal movement for measuring the angular rotation, comprising:

a frame plate;

an input gear rotatably mounted on said frame plate for receiving and being rotated by the rotation of a ring gear of the driving unit, said input gear having a hub thereon and a pinion;

an output gear rotatably mounted on said frame plate, said output gear having internal teeth;

an annular-reference gear mounted on said frame plate, said reference gear having internal teeth of a different number than the number of internal teeth of said output gear;

a planetary gear between said input gear pinion and the internal teeth of said reference gear and having teeth that engage the internal teeth of both said output gear and said reference gear;

a pivot lever driven by said output gear that is pivotally moved by said output gear which rotates through the action of said planetary gear in response to rotation of said input gear by the driving unit; and a sensor unit including an angle diaphragm carried by said pivot lever.

2. A device as in claim 1 wherein the input gear, the reference gear, the output gear and the pinion are arranged concentrically relative to a common axis.

3. A device according to claim 1, further comprising:

a biasing means for holding the sensor unit under a spring pre-tension.

4. A device according to claim 1 further comprising:

a cover plate arranged parallel to the frame plate, the output gear and the sensor unit being between the frame plate and the cover plate.

5. A device according to claim 1 wherein said input gear and the output gear are both mounted on a central shaft.

6. A device according to claim 5, wherein the input gear and output gear are supported by the frame plate and the planetary gear is supported between the input and output gears to form one unit.

7. A device as in claim 1 further comprising:

a second sensor unit comprising a line sensor with a plurality of opto-electronic converter elements aligned radially relative to rotational axis of a steering column of the drive unit;

wherein the sensor unit movable by the pivot lever comprises a light source which produces a ray of light to impinge the light emerging from diaphragm aperture on different converter elements of the line sensor; and an optical member arranged to deflect the light leaving the diaphragm aperture onto the line sensor.

* * * * *